(12) United States Patent
Lee et al.

(10) Patent No.: US 10,274,966 B2
(45) Date of Patent: Apr. 30, 2019

(54) AUTONOMOUS MOBILE DEVICE AND METHOD OF FORMING GUIDING PATH

(71) Applicant: Shenzhen Airdrawing Technology Service Co., Ltd., Shenzhen (CN)

(72) Inventors: Horng-Juing Lee, New Taipei (TW); Tien-Ping Liu, New Taipei (TW); Shu-Fen Chen, New Taipei (TW); Yu-Chien Hsiao, New Taipei (TW); Yu-Tai Hung, New Taipei (TW); Fu-Hsiung Yang, New Taipei (TW)

(73) Assignee: Shenzhen Airdrawing Technology Service Co., Ltd, Shenzhen (CN)

( * ) Notice: Subject to any disclaimer, the term of this patent is extended or adjusted under 35 U.S.C. 154(b) by 111 days.

(21) Appl. No.: 15/395,005

(22) Filed: Dec. 30, 2016

(65) Prior Publication Data
US 2018/0039281 A1  Feb. 8, 2018

(30) Foreign Application Priority Data
Aug. 4, 2016 (TW) .................................. 105124849

(51) Int. Cl.
G05D 1/00 (2006.01)
G05D 1/02 (2006.01)

(52) U.S. Cl.
CPC ......... G05D 1/0274 (2013.01); G05D 1/0234 (2013.01); G05D 1/0246 (2013.01)

(58) Field of Classification Search
USPC .................................................... 701/23–28
See application file for complete search history.

(56) References Cited

U.S. PATENT DOCUMENTS

| | | | | |
|---|---|---|---|---|
| 4,589,810 A | * | 5/1986 | Heindl | B25J 13/02 414/4 |
| 6,285,920 B1 | * | 9/2001 | McGee | G05B 19/423 219/125.11 |
| 6,314,341 B1 | * | 11/2001 | Kanayama | G05D 1/0221 180/167 |
| 6,347,261 B1 | * | 2/2002 | Sakaue | B25J 9/1694 345/156 |
| 6,453,212 B1 | * | 9/2002 | Asama | B25J 5/007 318/587 |
| 6,459,955 B1 | * | 10/2002 | Bartsch | A47L 9/00 700/245 |

(Continued)

*Primary Examiner* — Jonathan L Sample
(74) *Attorney, Agent, or Firm* — ScienBiziP, P.C.

(57) ABSTRACT

An autonomous mobile device includes a map interpretation module, an image collection module, an image collection module, an artificial marker identification module, a personal guidance module, a voice input module and a control module. The image collection module collects an image in front of the autonomous mobile device and form an image signal. The artificial marker identification module receives the image signal and identifies the artificial marker in the image to achieve a positioning of the autonomous mobile device. The personal guidance module activates a personal guidance mode of the autonomous mobile device, and stores a location of a guidance point and an actual movement information of the autonomous mobile device to form a guidance path. The voice input module inputs a name of the guidance path. The control module controls the autonomous mobile device to move according to the guidance path stored by the map interpretation module.

12 Claims, 3 Drawing Sheets

(56) References Cited

U.S. PATENT DOCUMENTS

| | | | | |
|---|---|---|---|---|
| 7,015,831 B2* | 3/2006 | Karlsson | | G01C 21/12 340/995.1 |
| 7,848,850 B2* | 12/2010 | Hoshino | | G06K 9/00362 700/264 |
| 9,829,333 B1* | 11/2017 | Calder | | G01C 21/3492 |
| 9,945,677 B1* | 4/2018 | Watts | | G01C 21/34 |
| 10,071,891 B2* | 9/2018 | High | | E01H 5/12 |
| 2003/0114959 A1* | 6/2003 | Sakamoto | | G06N 3/008 700/245 |
| 2003/0144763 A1* | 7/2003 | Mori | | B62D 57/032 700/245 |
| 2005/0041839 A1* | 2/2005 | Saitou | | H04N 1/00127 382/103 |
| 2005/0256611 A1* | 11/2005 | Pretlove | | B25J 9/1664 700/264 |
| 2006/0056678 A1* | 3/2006 | Tanaka | | G06N 3/008 382/153 |
| 2006/0140450 A1* | 6/2006 | Hong | | G06K 9/00335 382/107 |
| 2006/0241792 A1* | 10/2006 | Pretlove | | G06F 3/011 700/83 |
| 2006/0293792 A1* | 12/2006 | Hasegawa | | G05D 1/0212 700/245 |
| 2007/0013510 A1* | 1/2007 | Yamada | | G01S 13/74 340/539.1 |
| 2007/0022078 A1* | 1/2007 | Gupta | | G06N 5/00 706/59 |
| 2007/0135962 A1* | 6/2007 | Kawabe | | G01S 17/74 700/225 |
| 2007/0192910 A1* | 8/2007 | Vu | | B25J 5/007 700/245 |
| 2007/0233318 A1* | 10/2007 | Lei | | G05D 1/0038 700/245 |
| 2009/0021351 A1* | 1/2009 | Beniyama | | G05D 1/024 340/10.1 |
| 2010/0049366 A1* | 2/2010 | Lee | | G05D 1/0274 700/258 |
| 2010/0063652 A1* | 3/2010 | Anderson | | A61B 5/02055 701/2 |
| 2010/0222925 A1* | 9/2010 | Anezaki | | G05D 1/0221 700/253 |
| 2012/0197439 A1* | 8/2012 | Wang | | B25J 9/1689 700/259 |
| 2012/0215380 A1* | 8/2012 | Fouillade | | G05D 1/0038 701/2 |
| 2015/0283701 A1* | 10/2015 | Izhikevich | | G06N 3/008 700/250 |
| 2015/0283702 A1* | 10/2015 | Izhikevich | | B25J 9/163 700/257 |
| 2015/0283703 A1* | 10/2015 | Izhikevich | | B25J 9/163 706/11 |
| 2017/0282731 A1* | 10/2017 | Kwa | | B60L 11/1827 |
| 2018/0039280 A1* | 2/2018 | Lee | | B60R 11/04 |

* cited by examiner

AUTONOMOUS MOBILE DEVICE AND METHOD OF FORMING GUIDING PATH

CROSS-REFERENCE TO RELATED APPLICATIONS

This application claims all benefits accruing under 35 U.S.C. § 119 from TW Patent Application No. 105124849, filed on Aug. 4, 2016 in the TW Intellectual Property Office, the contents of which are hereby incorporated by reference.

FIELD

The subject matter herein generally relates to an autonomous mobile device and a method of forming a guiding path.

BACKGROUND

Simultaneous localization and mapping (SLAM) is commonly used in an autonomous mobile device for positioning. SLAM means the autonomous mobile device starts from an unknown environment location, and establish its own location and posture by repeatedly observing map features during a movement; then incrementally constructing a map, so as to achieve a self-locating and map-constructing simultaneously. SLAM commonly achieves positioning by more information from the sensor, such as GPS, IMU, Odometry. When the autonomous mobile device moves by universal wheel or omni wheel, the odometry can not provide a reference to a moving distance, and the GPS also can not be used in an interior room environment.

An artificial marker is commonly used to achieve positioning. But the artificial marker is generally pre-set in the desired location, and then a procedure is written to control the autonomous mobile device moving on the map. Technical staff will provide on-site service to set the artificial marker and write the procedure according to the desired area environment after users buying the autonomous mobile device. The artificial marker is generally located on a starting point, a destination, or a corner. A wheel rotation direction and an outputted motor of the autonomous mobile device can be calculated by a distance between two artificial markers and a road surface environment. But the autonomous mobile device can not accurately arrive at the destination because that a wheel of the autonomous mobile device may be slipping or idling during a movement. Thus, the autonomous mobile device needs to go back and forth to debug and modify several times in order to accurately arrive at the destination. The need for technical staff on-site service every time is time-consuming and laborious.

BRIEF DESCRIPTION OF THE DRAWING

Implementations of the present technology will now be described, by way of example only, with reference to the attached figures, wherein.

DETAILED DESCRIPTION

Figure 1:
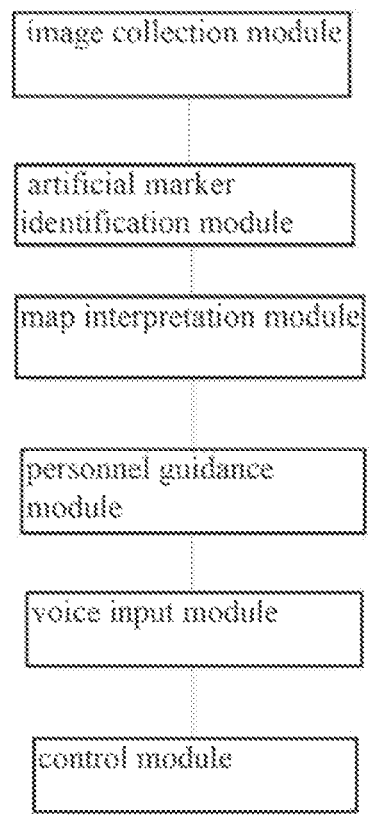
FIG. 1 is a schematic view of a module of an autonomous mobile device to one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature described, such that the component need not be exactly conforming to such feature. The term "comprise," when utilized, means "include, but not necessarily limited to"; it specifically indicates open-ended inclusion or membership in the so-described combination, group, series, and the like.

Referring to FIG. 1, the present disclosure is described in relation to an autonomous mobile device. The autonomous mobile device comprises a map interpretation module, an image collection module, an artificial marker identification module, a personal guidance module, a voice input module, and a control module. The map interpretation stores a map of a desired moving area, a map description file corresponding to the map, and a location information of an ID corresponding to an artificial marker. A plurality of artificial markers are located in the desired moving area, and the autonomous mobile device moves between the plurality of artificial markers. The image collection module is used to collect an image in front of the autonomous mobile device during the movement in the desired moving area and form an image signal and transmit the image signal to the artificial marker identification module. The artificial marker identification module receives the image signal outputted by the image collection module and identifies the artificial marker of the image to achieve positioning of the autonomous mobile device. The personal guidance module activates a personal guidance mode of the autonomous mobile device, continuously defines a specific point as a guidance point, and stores a location of the guidance point relative to the artificial marker and an actual movement information of the autonomous mobile device in the map interpretation module to form a guidance path. The voice input module is used to input a name of the guidance path, and the guidance path is automatically added in the autonomous mobile device. The control module controls the autonomous mobile device to move according to the guidance path stored by the map interpretation module.

The autonomous mobile device can be any mobile device, such as robot or unmanned vehicle. The autonomous mobile device moves by a foot or a wheel.

The desired moving area can be a workplace, such as a workshop, a restaurant, or a tourist station. The artificial marker and the guidance points are located in the desired moving area. Each artificial marker corresponds to an ID. The ID may include a number, a character, etc. Each ID represents a name of an artificial marker, such as a starting point or a destination. The artificial marker can be Tag36h11 marker series, Tag36h10 marker series, Tag25h9 marker series, or Tag16h5 marker series.

The map interpretation module stores the map of the desired moving area, the map description file corresponding to the map, and the location information of the ID corresponding to the artificial marker. The plurality of artificial markers are located in the desired moving area, and the autonomous mobile device moves between the plurality of artificial markers. The map is stored in a designated mark language (XML) or another format file, wherein the artificial marker is defined. The map description file includes a description of a vicinity of the artificial marker on the map. The map description file may be a place name marked by the artificial marker on the map.

The map interpretation module further stores a plurality of guidance points, the location of the guidance point relative to the artificial marker, and the actual movement information of the autonomous mobile device.

The image collection module comprises a camera. The camera is located on the side of the autonomous mobile device facing a direction of movement to capture the image in a field of view, so as to be capable of capturing the artificial marker to form the image signal. The image collection module transmits the image signal to the artificial marker identification module through a data line. The camera can be a web camera based on Charge-coupled Device (CCD) or Complementary Metal Oxide Semiconductor (CMOS).

The artificial marker identification module receives the image captured by the image collection module, and reads and identifies the artificial marker in the image. The artificial marker identification module transmits the ID of the artificial marker to the map interpretation module, to determine a position and an angle of the autonomous mobile device relative to the artificial marker, so as to realize positioning. The artificial marker identification module can calculate the distance and the angle between the autonomous mobile device and the artificial marker according to a collected artificial marker, and the control module can fine tune the autonomous mobile device to move to the artificial marker.

The personnel guidance module activates the personal guidance mode to make the autonomous mobile device move and follow a guidance person. The personal guidance module continuously defines the specific point as the guidance point, and stores the location of the guidance point relative to the artificial marker and an actual movement information of the autonomous mobile device in the map interpretation module to form the guidance path.

The voice input module is used to input the name of the guidance path, and the guidance path is automatically added in the autonomous mobile device.

The control module controls the autonomous mobile device to move and arrive at the destination according to the guidance path stored by the map interpretation module.

Figure 2:
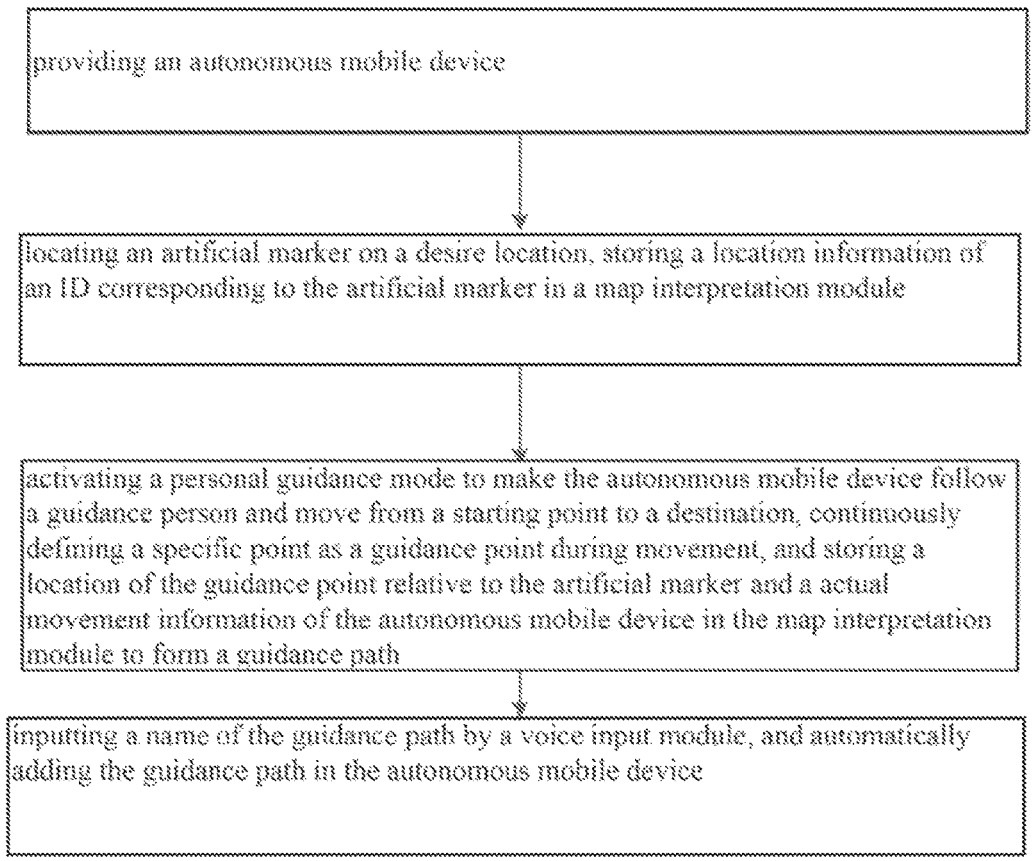
FIG. 2 is a flow chart of a method of forming a guiding path to one embodiment.

FIG. 2 illustrates one embodiment of a method of forming a guiding path comprising the following steps:

S1: providing an autonomous mobile device comprising a map interpretation module, an image collection module, an artificial marker identification module, a personal guidance module, a voice input module, and a control module;

S2: locating an artificial marker on a desired location, storing a location information of an ID corresponding to the artificial marker in the map interpretation module;

S3: activating their personal guidance mode to make the autonomous mobile device follow a guidance person and move from a starting point to a destination, continuously defining a specific point as a guidance point during movement of the autonomous mobile device, and storing a location of the guidance point relative to the artificial marker and an actual movement information of the autonomous mobile device in the map interpretation module to form a guidance path; and S4: inputting a name of the guidance path by the voice input module, and automatically adding the guidance path in the autonomous mobile device.

In step S1, the autonomous mobile device can be any mobile device, such as robot or unmanned vehicle.

In step S2, the artificial marker is located in the desired location. The location information of the ID corresponding to the artificial marker is stored in the map interpretation module. The image collection module continuously captures an image of the artificial marker around the desired moving area to form an image signal, and transmits the image signal to the artificial marker identification module. The artificial marker identification module identifies the image of the artificial marker and transmits the ID of the artificial marker to the map interpretation module. The map interpretation module determines the position of the autonomous mobile device according to the ID of the artificial marker, so as to achieve positioning of the autonomous mobile device.

In step S3, the personal guidance mode of the autonomous mobile device is activated to make the autonomous mobile device follow the guidance person and move from the starting point to the destination. The plurality of specific points is continuously defined as the guidance points during movement. Each specific point represents a location. There is an obstacle or a corner in the location, or a path roughness changes in the location. The autonomous mobile device follows the guidance person passing through the specific point and continuously defines the specific point as the guidance point. The autonomous mobile device stores the location of the artificial marker corresponding to the guidance point and the actual movement information of the autonomous mobile device in the map interpretation module to form the guidance path. The actual movement information of the autonomous mobile device includes the rotational direction of a wheel, the rotational speed of the wheel and a number of rotations of the wheel.

In step S4, the name of the guidance path is inputted by the voice input module, and the guidance path is automatically added in the autonomous mobile device.

The control module controls the autonomous mobile device to smoothly and accurately move to the destination according to the guidance path. After the autonomous mobile device arriving at a vicinity of the destination, the artificial marker identification module calculates the distance and the angle between the autonomous mobile device and the destination according to an collected artificial marker in the destination, and then the control module can fine-tune a movement of the autonomous mobile device to arrive at the destination.

In the autonomous mobile device and the method of forming a guiding path, the personal guidance mode of the autonomous mobile device is activated to make the autonomous mobile device follow a guidance person and move from the starting point to the destination. The autonomous mobile device follows the guidance personnel passing through the specific point and continuously defines the specific point as the guidance point. The autonomous mobile device stores the location of the guidance point relative to the artificial marker and the actual movement information of the autonomous mobile device in the map interpretation module to form the guidance path. The autonomous mobile device moves according to the guidance path. Therefore, it is possible to save a trouble of on-site service of a technician and manual operation, save time and effort, and the autonomous mobile device can smoothly and accurately arrive at the destination.

EXAMPLE 1

Figure 3:
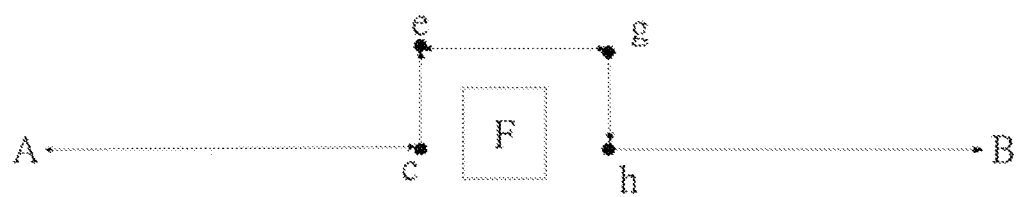
FIG. 3 is a schematic view of a robot moving in an area of example 1.

Referring to FIG. 3, the autonomous mobile device is a robot, and the robot moves within a desired moving area of a plant. An artificial marker A is located on a starting point and an artificial marker B is located on a destination in the desire moving area. The robot moves from the artificial marker A to the artificial marker B. Since it is a new environment, a personal guidance mode of the autonomous mobile device is activated, and the robot follows a guidance person from the starting point to the destination. When the autonomous mobile device moves forward and arrive at a point c, the autonomous mobile device can not move forward because of an obstacle F. The guidance person need to guide the robot to bypass the obstacle F. The obstacle F is a specific point. In order to bypass the obstacle F, the guidance person turns left and continuously moves. When the guidance person arrives at point e, the guidance person can dodge the obstacle. The guidance person continuously moves forward and arrives at point g according to an original route. The guidance person turns right and arrives at point h, and the obstacle F is bypassed. The guidance person arrives at the artificial marker B according to the original route after bypassing the obstacle F. The robot follows the guidance person in a movement from the artificial marker A to the artificial marker B. The robot starts from the artificial marker A, and goes straight 25 steps to arrive at the point c; then turns left and moves forward 4 steps to arrive at the point e; then turns right and moves forward 5 steps to arrive at the point g according to the original route; then turns right and moves forward 4 steps to the h point; and then moves forward 25 steps according to the original route to arrive at the artificial marker B. The above is the actual movement information of the robot. Also, there are other ways to bypass the obstacle F.

In the process of the robot moving from the starting point to the destination, the robot can not go straight and move forward when the robot encounters the obstacle. A guidance point F is added to indicate that there is the obstacle. The location of the guidance point relative to the artificial marker and the actual movement information of the autonomous mobile device are stored in the map interpretation module to form a guidance path.

The guidance path is named as "dodging the obstacle." The voice input module voice inputs a name of the guidance path as "dodging the obstacle," and a guidance path is automatically added in the robot.

The control module controls the robot to smoothly and accurately move to the destination according to the guidance path named as "dodging the obstacle."

When there is a corner between the artificial marker A and the artificial marker B or a road roughness between the artificial marker A and the artificial marker B is changed, the autonomous mobile device can smoothly and accurately move to the destination by locating a plurality of guidance points.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. An autonomous mobile device comprising:
a map interpretation module configured to store a map of a desire moving area, a map description file corresponding to the map, and a location information of an ID corresponding to an artificial marker, wherein the artificial marker is located in a desired moving area;
an image collection device configured to collect an image in front of the autonomous mobile device during the autonomous mobile device moving in the desired moving area and form an image signal;
an artificial marker identification module configured to receive the image signal outputted by the image collection device, and identify the artificial marker in the image to achieve a positioning of the autonomous mobile device;
a personal guidance module configured to activate a personal guidance mode of the autonomous mobile device, continuously define a specific point of a guidance person location as a guidance point followed by the autonomous mobile device to dodge an obstacle, and store a location of the guidance point relative to the artificial marker and an actual movement information of the autonomous mobile device in the map interpretation module to form a guidance path;
a voice input module configured to input a name of the guidance path, and the guidance path is automatically added in the autonomous mobile device; and
a control module configured to control the autonomous mobile device to move according to the guidance path stored by the map interpretation module.

2. The autonomous mobile device of claim 1, wherein the artificial marker is selected from the group consisting of Tag36h11 marker series, Tag36h10 marker series, Tag25h9 marker series, and Tag16h5 marker series.

3. The autonomous mobile device of claim 1, wherein the map interpretation module further stores the guidance point, a guidance point location relative to the artificial marker, and the actual movement information of the autonomous mobile device.

4. The autonomous mobile device of claim 1, wherein the artificial marker identification module calculates a distance and an angle between the autonomous mobile device and the artificial marker according to a collected artificial marker, and the control module fine tunes the autonomous mobile device to move to the artificial marker.

5. The autonomous mobile device of claim 1, wherein the ID is a number or a character.

6. The autonomous mobile device of claim 1, wherein the image collection device comprises a camera, and the camera is located on a side of the autonomous mobile device facing a moving direction of the autonomous mobile device to capture the image in a field of view.

7. The autonomous mobile device of claim 6, wherein the camera is a web camera based on Charge-coupled Device or Complementary Metal Oxide Semiconductor.

8. A method of forming a guiding path comprising:
S1: providing an autonomous mobile device comprising a map interpretation module, an image collection device, an artificial marker identification module, a personal guidance module, a voice input module, and a control module;
S2: locating an artificial marker on a desired location, storing a location information of an ID corresponding to the artificial marker in the map interpretation module;
S3: activating a personal guidance mode to make the autonomous mobile device follow a guidance person and move from a starting point to a destination, continuously defining a specific point of a guidance person location as a guidance point followed by the autonomous mobile device during a movement of the autonomous mobile device to dodge an obstacle, and storing a location of the guidance point relative to the artificial marker and an actual movement information of the autonomous mobile device in the map interpretation module to form a guidance path; and
S4: inputting a name of the guidance path by the voice input module, and automatically adding the guidance path in the autonomous mobile device.

9. The method of claim 8, wherein the actual movement information of the autonomous mobile device comprises a rotational direction of a wheel, a rotational speed of the wheel and a number of rotations of the wheel.

10. The method of claim 8, wherein the image collection device continuously captures an image of the artificial marker in a desired moving area to form a image signal, and transmits the image signal to the artificial marker identification module in the S2.

11. The method of claim 10, wherein the artificial marker identification module identifies the artificial marker, and transmits an ID of the artificial marker to the map interpretation module in the S2.

12. The method of claim 11, wherein the map interpretation module determines a position of the autonomous mobile device according to the ID of the artificial marker, so as to achieve a positioning of the autonomous mobile device in the S2.

* * * * *